United States Patent
Franzen et al.

(10) Patent No.: US 11,159,421 B2
(45) Date of Patent: Oct. 26, 2021

(54) ROUTING TABLE SELECTION IN A POLICY BASED ROUTING SYSTEM

(71) Applicant: Telefonaktiebolaget LM Ericsson (publ), Stockholm (SE)

(72) Inventors: Anders Franzen, Trångsund (SE); Tarik Hammam, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 75 days.

(21) Appl. No.: 16/615,108

(22) PCT Filed: May 24, 2017

(86) PCT No.: PCT/SE2017/050560
§ 371 (c)(1),
(2) Date: Nov. 19, 2019

(87) PCT Pub. No.: WO2018/217143
PCT Pub. Date: Nov. 29, 2018

(65) Prior Publication Data
US 2020/0177494 A1    Jun. 4, 2020

(51) Int. Cl.
*H04L 12/741* (2013.01)
*H04L 12/733* (2013.01)
*G06F 9/455* (2018.01)
*H04L 12/713* (2013.01)
*H04L 29/06* (2006.01)

(52) U.S. Cl.
CPC .......... *H04L 45/20* (2013.01); *G06F 9/45558* (2013.01); *H04L 45/54* (2013.01);
(Continued)

(58) Field of Classification Search
CPC .......... H04L 45/54; H04Q 2213/13353; G06F 16/9017–16/902
See application file for complete search history.

(56) References Cited

U.S. PATENT DOCUMENTS 7,813,346 B1    10/2010 Kuwabara et al.
7,894,451 B2 *   2/2011 Parker ..................... H04L 45/00
                                                     370/395.32
(Continued)

FOREIGN PATENT DOCUMENTS

CN          103647716 A       3/2014

OTHER PUBLICATIONS

First Office Action, CN App. No. 201780091122.8, dated Jun. 3, 2020, 30 pages (17 pages of English Translation and 13 pages of Original Document).
(Continued)

*Primary Examiner* — Hoon J Chung
(74) *Attorney, Agent, or Firm* — Nicholson De Vos Webster & Elliott LLP

(57) ABSTRACT

A method implemented by a network device for selection of a routing table in a Policy Based Routing (PBR) system is described. The method may include receiving a packet from a first network domain; generating a firewall mark for the packet, wherein the firewall mark includes a network domain indication and a packet classification indication; determining a match between the network domain indication of the packet and a selector of a matched rule in a set of rules; and upon determining the match between the network domain indication of the packet and the selector of the matched rule, inputting the firewall mark to a function of the matched rule to identify a routing table for the packet.

20 Claims, 10 Drawing Sheets

(52) U.S. Cl.
    CPC .......... *H04L 45/586* (2013.01); *H04L 63/029* (2013.01); *H04L 69/22* (2013.01); *G06F 2009/45595* (2013.01)

(56) References Cited

U.S. PATENT DOCUMENTS

2014/0310307 A1* 10/2014 Levy .................. G06F 16/9014
                                                       707/769
2015/0222598 A1    8/2015 Koponen et al.

OTHER PUBLICATIONS

International Preliminary Report on Patentability, PCT App. No. PCT/SE2017/050560, dated Dec. 5, 2019, 12 pages.
International Search Report and Written Opinion for Application No. PCT/SE2017/050560, dated Nov. 22, 2017, 13 pages.
Gupta et al., "Packet Classification on Multiple Fields," ACM SIGCOMM Computer Communication Review, vol. 29, Issue 4, Oct. 1999, pp. 147-160.
Litvak M., "IP-rule(8)—routing policy database management," Linux/UNIX system programming training, Dec. 20, 2011, 5 pages, retrieved from Internet: http://man7.org/linux/man-pages/man8/ip-rule.8.html.
Ould-Brahim et al., "Network based IP VPN Architecture using Virtual Routers," Provider Provisioned VPN WG, Internet Draft, May 2003, 19 pages, retrieved from Internet: https://tools.ietf.org/pdf/draft-ietf-ppvpn-vpn-vr-04.pdf.

* cited by examiner

ROUTING TABLE SELECTION IN A POLICY BASED ROUTING SYSTEM

CROSS-REFERENCE TO RELATED APPLICATIONS

This application is a National stage of International Application No. PCT/SE2017/050560, filed May 24, 2017, which is hereby incorporated by reference.

TECHNICAL FIELD

Embodiments described herein relate to the field of selecting a routing table; and more specifically, to selecting a routing table for a packet in a Policy Based Routing (PBR) system.

BACKGROUND

Routing is the process of selecting a path for traffic in a network, or between or across multiple networks. In some cases, routing may be performed to compartmentalize network resources. There can be many reasons for compartmentalizing network resources in routed networks and the use of multiple routing tables in a routing device is a technique to facilitate a structural separation that delineates routing control and forwarding behavior without adding extra routing devices in the form of additional hardware units. For example, multiple routing tables can be used (1) when there is a need to segregate traffic of different enterprises traversing common equipment, (2) in arrangements that offer special path diversity forwarding over independent networks, (3) as a means of separating route processing in a routing device with respect to unicast and multicast traffic or (4) in network slicing scenarios that accommodate special forwarding properties.

In general, the term "routing" implies that a router only looks at the destination Internet Protocol (IP) address in a packet to determine the next-hop address to forward the packet. However, when there is a need to consider other information for the routing decision or in case it must first be established, based on certain policy criteria, which routing table to select, the term Policy Based Routing (PBR) is used. In a PBR system, the packet processing is governed by an in-priority ordered list of PBR rules. This ordered list may be referred to as a Route Policy Database (RPDB). A PBR rule may include or consist of a selector, which identifies categories or classifications of a packet, and an action predicate.

Packet classification is a process or mechanism that categorizes traffic packets into classes based on information in the packet, information associated with the packet or a result of processing of said information. The classified packets may then be marked ("colored") so that processes and/or devices can easily identify the packets belonging to a class and provide differentiated processing based on packet markings (colors). This classification technique may be used in routers and firewalls to provide, for example, differentiated Quality-of-Service (QoS) and policy based packet processing for a category (a color) of packets. The mark (color) is sometimes referred to as Firewall Mark (fwmark) and may be represented by an integer value.

For example, when a packet is received by a network device, the packet may be classified to produce a fwmark. The fwmark may thereafter be compared with selectors of corresponding PBR rules in a RPDB. Upon determining a match, a corresponding action predicate of the matching PBR rule may be taken. For instance, a first fwmark value may correspond to a selector of a first PBR rule. In response to the fwmark of the packet matching the selector of the first PBR rule, the action predicate of the first PBR rule may be taken. In this case, the action predicate may be selection of a first routing table for determining the next hop for the packet. Similarly, another packet received by the network device may be classified and associated with a second fwmark value. This second fwmark value will not match the selector of the first PBR rule, but instead matches the selector for a second PBR rule. In response to the match with the selector of the second PBR rule, the action predicate of the second rule may be taken. In this case, the action predicate of the second PBR rule may be the selection of a second routing table for determining the next hop for the packet.

In complex real world scenarios, there can be hundreds or thousands of PBR rules in a single RPDB. In some cases, hundreds or thousands of PBR rules may be focused on each associated network domain and a RPDB may cover several network domains. Further, some of these rules may be unrelated to selection of routing tables (e.g., an action enforcing packet drop) or based on selectors other than fwmark. Since each packet may need to be compared against a large number of PBR rule selectors, routing table selection speed often becomes severely reduced. Additionally, as the number of PBR rules in each RPDB grows, the difficulty and burden on managing RPDBs is similarly affected.

SUMMARY

A method implemented by a network device for selection of a routing table in a Policy Based Routing (PBR) system is described. The method may include receiving a packet from a first network domain; generating a firewall mark for the packet, wherein the firewall mark includes a network domain indication and a packet classification indication; determining a match between the network domain indication of the packet and a selector of a matched rule in a set of rules; and upon determining the match between the network domain indication of the packet and the selector of the matched rule, inputting the firewall mark to a function of the matched rule to identify a routing table for the packet.

A network device is also described herein. The network device may comprise a non-transitory machine-readable storage medium having stored therein a classifier and a routing policy engine; and a processor coupled to the non-transitory machine-readable storage medium. The processor may be configured to execute the classifier and the routing policy engine, wherein the classifier is configured to receive a packet from a first network domain and generate a firewall mark for the packet, wherein the firewall mark includes a network domain indication and a packet classification indication, and wherein the routing policy engine is configured to determine a match between the network domain indication of the packet and a selector of a matched rule in a set of rules and upon determining the match between the network domain indication of the packet and the selector of the matched rule, input the firewall mark to a function of the matched rule to identify a routing table for the packet.

In systems with a large amount of PBR rules and where PBR based selection of routing tables is based on packet classification, the systems and methods described herein drastically speed up the selection of routing tables. Specifically, in typical real world deployment scenarios, with several hundred PBR rules, routing table selection has been measured at one-hundred times faster in comparison to traditional techniques. This improved performance is achieved without degrading other PBR based capabilities.

Further, the described systems and methods, which act on PBR rules using the fwmark as a selector, still work in concordance/harmony with PBR rules in a Route Policy Database (RPDB) acting on selectors other than fwmark. For example, a higher priority PBR rule can be inserted in RPDB to drop or segregate certain traffic based on a source Internet Protocol (IP) selector.

Additionally, the described systems and methods lead to a more compact RPDB with fewer entries (e.g., PBR rules) than traditional systems. In particular, several PBR rules covering the selection of routing tables using fwmark as a selector for a single network domain may be combined into a single PBR rule. This reduced number of PBR rules produces a more compact RPDB that is easier to manage.

The systems and methods described herein may be applicable to load balancing, firewalling or routing systems that use a plurality of routing tables. Additionally, the PBR described herein may be independent of the specific product and supports multiple network domains with overlapping IP addresses.

BRIEF DESCRIPTION OF THE DRAWINGS

The systems, devices, structures, methods, and designs may best be understood by referring to the following description and accompanying drawings that are used to illustrate embodiments. In the drawings.

DETAILED DESCRIPTION

The following description describes methods and apparatuses for selecting a routing table for a packet in a Policy Based Routing (PBR) by including a network domain indication along with a packet classification indication associated with the packet in a Firewall Mark (fwmark). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present systems, devices, structures, methods, and designs. It will be appreciated, however, by one skilled in the art that the embodiments described herein may be practiced without such specific details. In other instances, control structures, gate level circuits and full software instruction sequences have not been shown in detail in order not to obscure the systems, devices, structures, methods, and designs described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
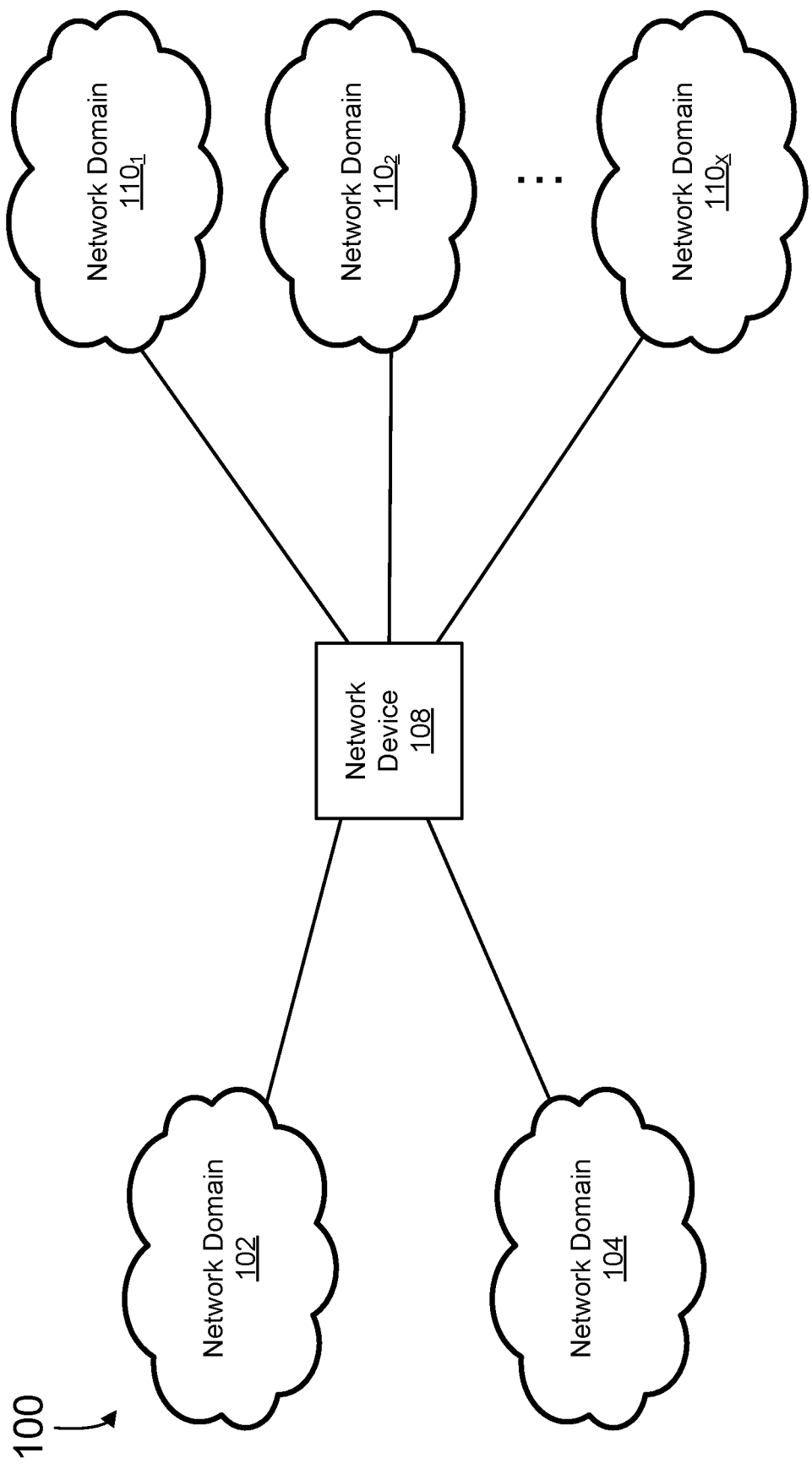
FIG. 1 shows a network system, including a set of network domains, according to one embodiment.

FIG. 1 shows a network system 1100 according to one embodiment. The network system 100 may be composed of a set of network domains, including the network domains 102, 104, and 110$_1$-110$_X$. Each of the network domains 102, 104, and 110$_1$-110$_X$ may be interconnected through one or more wired or wireless connections. In some embodiments, each network domain 102, 104, and 110$_1$-110$_X$ may represent a different private computer network within the network system 100. In this embodiment, each network domain 102, 104, and 110$_1$-110$_X$ may have separate or overlapping address ranges/spaces for assignment to each corresponding device within the respective network domain 102, 104, and 110$_1$-110$_X$.

Each network domain 102, 104, and 110$_1$-110$_X$ may include a set of network devices that operate to route packets through the network system 100. In one embodiment, as shown in FIG. 1, the network device 108 may straddle the network domains 102, 104, and 110$_1$-110$_X$. In this configuration, the network device 108 may be operable to receive packets from the network domains 102 and 104 and forward the received packets to one of the network domains 110$_1$-110$_X$ (e.g., a next hop). In one embodiment, the decision as to which of the network domains 110$_1$-110$_X$ that the received packets will be forwarded to may be based on a selected routing table stored in or otherwise accessible by the network device 108.

Figure 2:
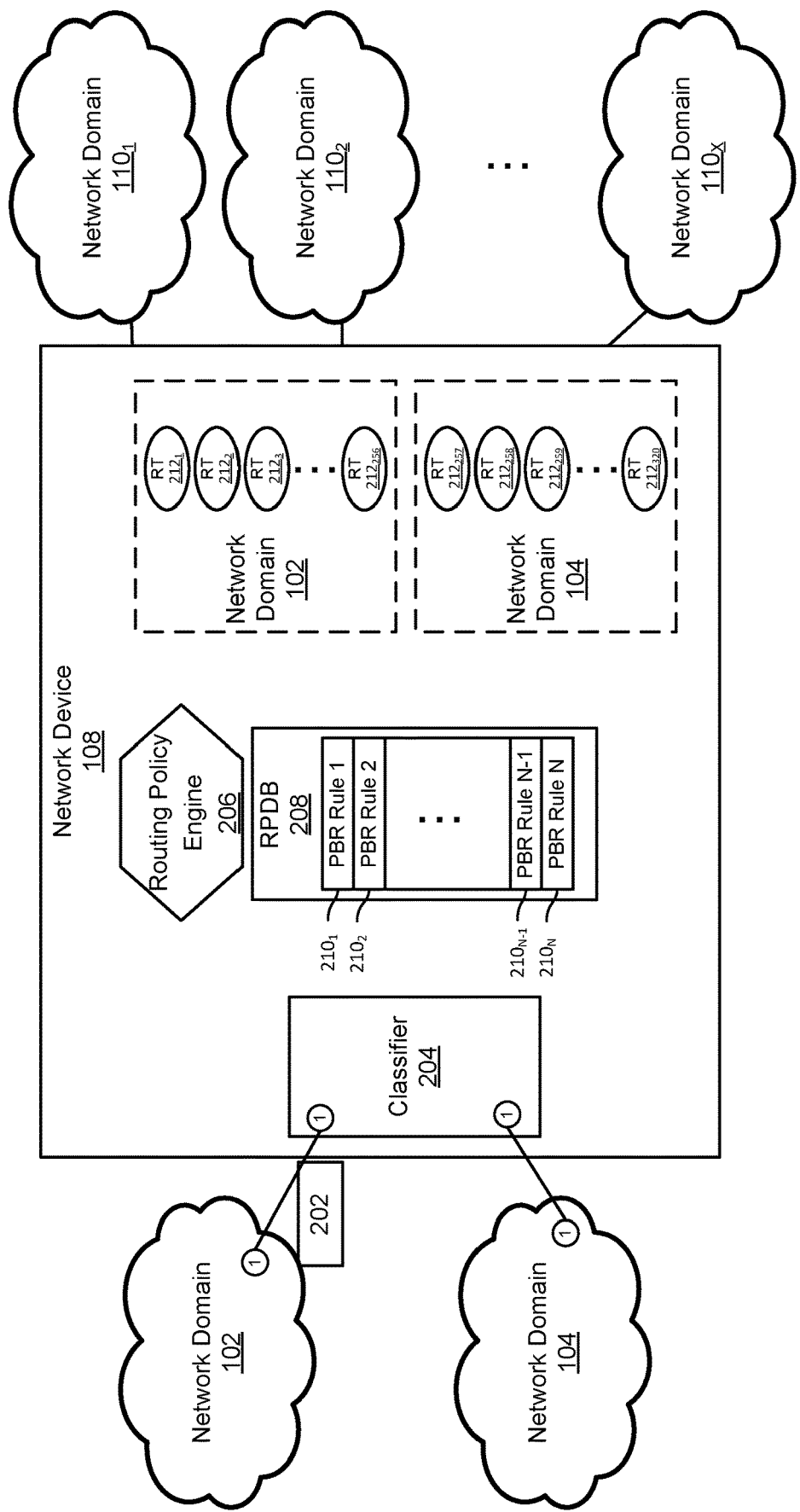
FIG. 2 shows an example of a network device, which operated in a network domain of the network system, according to one embodiment.

FIG. 2 shows an example of the network device 108 according to one embodiment. As shown, the network device 108 may be connected to the network domain 102 and the network domain 104. Connections with the network domains 102 and 104 may be established via wired and/or wireless mediums. In one embodiment, these connections allow the network device 108 to receive one or more packets transmitted from devices within the network domains 102 and 104. For example, as shown in FIG. 2, the network device 108 may receive a packet 202 from a source device operating within the network domain 102.

The packet 202 may be a formatted unit of data, which includes control information and user data. For example, control information may be located in a Physical (PHY) or Media Access Control (MAC) header of the packet 202 and may include a source address of the transmitting device, a destination address of the receiving device (e.g., the ultimate/intended destination of the packet 202), priority of service or quality-of-service (QoS) information, a length indicator, error detection/correction information, and/or one or more similar pieces of control information. The packet 202 may be an Internet Protocol datagram. The user data may be located in a payload of the packet 202 and may include text, video, image, audio, or other similar pieces of data that is intended for consumption by the receiving device. For example, the packet 202 may include a portion of a video in a payload to be viewed by a user of the receiving/destination device.

As shown in FIG. 2, a classifier 204 of the network device 108 receives the packet 202 from the network domain 102. Although the final destination of the packet 202 is not the network device 108, the network device 108 may assist in guiding the packet to the ultimate destination by forwarding the packet 202 to a next-hop in the network system 100 as will be described herein. In one embodiment, the classifier 204 classifies packets algorithmically in accordance with specified classification criteria. In some embodiments, this classification criteria may be specified per network domain such that packets received from the network domain 102 are classified according to a first set of classification criteria and packets received from the network domain 104 are classified according to a second set of classification criteria.

Accordingly, the packet 202 may be classified in accordance with a technique specified for the network domain 102, from which the packet 202 was received. This classification, performed by the classifier 204, may produce/generate/output a packet classification indication. In one embodiment, the packet classification indication may describe information within the packet 202 (e.g., describing information within a payload or header of the packet 202), information associated with the packet 202, and/or information produced from processing either of the preceding pieces of information. For example, the classification technique associated with the network domain 102 may be based on a hash of a source Internet Protocol (IP) address, a destination IP address and/or other information available in a header of the packet 202. In this example, the hash could be done as an Exclusive OR (XOR) of binary information representing the source IP address and the destination IP address in the header of the packet 202. However, in other embodiments, other hashing techniques may be utilized.

The classification described above, produces marked or "colored" packets so that the systems and methods described herein can easily identify packets belonging to a particular class and provide differentiated processing based on the packet markings/colors (e.g., selecting different routing tables based on the markings/colors). This differentiated processing may provide different QoS and policy based packet processing for a class/category (e.g., color) of packets. In some embodiments, the terms "color" or "marking" may be referred to as a Firewall Mark (fwmark) and may be represented by an integer value.

Although described and shown in FIG. 2 as the classifier 204 of the network device 108 receiving packets from multiple network domains (e.g., the network domain 102 and the network domain 104), in other embodiments, the systems and methods described herein may operate in a similar fashion with a single receiving network domain (e.g., the classifier 204 only receives packets from the network domain 102).

Figure 3:
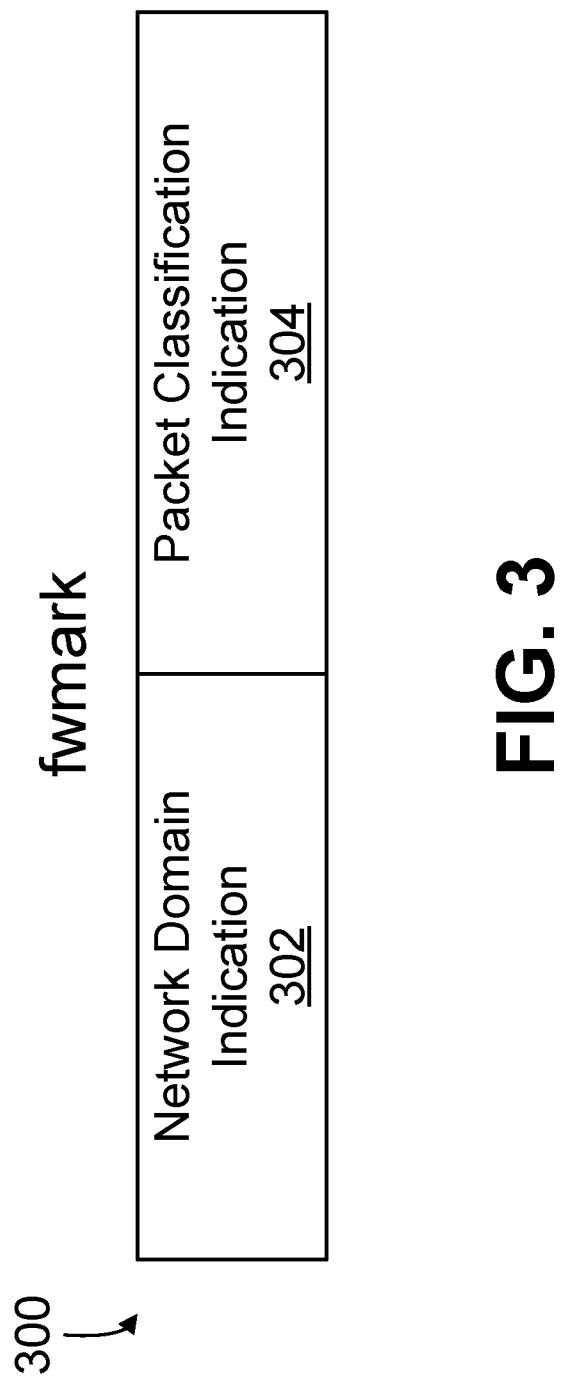
FIG. 3 shows a Firewall Mark (fwmark), including a network domain indication and a packet classification indication, according to one embodiment.

As noted above, the classification of the packet 202 by the classifier 204 may produce a fwmark for the packet 202. In one embodiment, the fwmark for the packet 202 may be composed of two portions of data: (1) a network domain indication and (2) a packet classification indication. FIG. 3 shows an example fwmark 300 with a network domain indication 302 and a packet classification indication 304 according to one embodiment.

In one embodiment, the packet classification indication 304 corresponds to the classification performed by the classifier 204 described above and the network domain indication 302 uniquely identifies the network domain that the packet 202 was received from (e.g., the network domain 102). Both the packet classification indication 304 and the network domain indication 302 may be represented in the binary address space. In one embodiment, the network domain indication 302 may be assigned by the classifier 204, while in other embodiments the network domain indication 302 may be assigned by another component of the network system 100. For example, the network domain indication 302 may correspond to an identifier that is used by the network system 100 to identify network domains and the classifier 204 uses these network system 100 assigned network domain identifiers for the network domain indication 302.

As will be described herein, the fwmark 300 may be used to map the packet 202 to a particular routing table, which will be used to route the packet 202 to a next-hop in the network system 100. In particular, a function, corresponding to a rule associated with the network domain 102, may identify a single routing table based on the fwmark 300 of the packet. Throughout this discussion, the network domain indication 302 may be alternatively referred to as a network domain identifier or a network domain key. Similarly, the packet classification indication 304 may be alternatively referred to as a classification identifier, classification key, category indication, category identifier, or category key.

In one embodiment, the length of the network domain indication 302 and the length of the packet classification indication 304 may be uniform/equal across all network domains. For example, the length of the network domain indication 302 corresponding to the network domain 102 may be sixteen bits and the network domain indication 302 corresponding to the network domain 104 may also be sixteen bits. However, in other embodiments, the length of the network domain indication 302 and/or the packet classification indication 304 may be variable across network domains. For example, a network domain indication 302 for the packet 202, which was received from the network domain 102, may be sixteen bits whereas a network domain indication 302 for a packet received from the network domain 104 may be eight bits. In some embodiments, the variability of the lengths of the network domain indication 302 and the packet classification indication 304 may be dependent on each other. For example, the fwmark 300 may be of a predefined size across all network domains and the sum of the lengths of the network domain indication 302 and the packet classification indication 304 may not exceed this predefined size. In this example embodiment, as the length of the network domain indication 302 expands or contracts, the length of the packet classification indication 304 will be equally and oppositely expanded or contracted such that the predefined size of the fwmark 300 is not exceeded. In one embodiment, the variability of the network domain indication 302 and the packet classification indication 304 may be specified for the classifier 204 and may be implemented/accomplished through the use of a network domain dependent mask. As described in further detail below, rules associated with network domains that use both a network domain indication 302 and packet classification indication 304 via a fwmark 300 may utilize a corresponding domain dependent mask to isolate the network domain indication 302.

Following classification of the packet 202 and generation of the fwmark 300, the fwmark 300 of the packet 202 may be passed or otherwise made accessible to the routing policy engine 206. The routing policy engine 206 is governed by a Route Policy Database (RPDB) 208 as shown in FIG. 2. In one embodiment, the RPDB 208 is composed of a set of Policy Based Routing (PBR) rules $210_1$-$210_N$. In some embodiments, the PBR rules $210_1$-$210_N$ may be ordered in decreasing order of priority/importance. For example, in these embodiments, a PBR rule 210 at the top/front of the RPDB 208 (e.g., PBR rule $210_1$) may be of higher priority/importance than a PBR rule 210 at the bottom/back of the RPDB 208 (e.g., PBR rule $201_N$).

Figure 4:
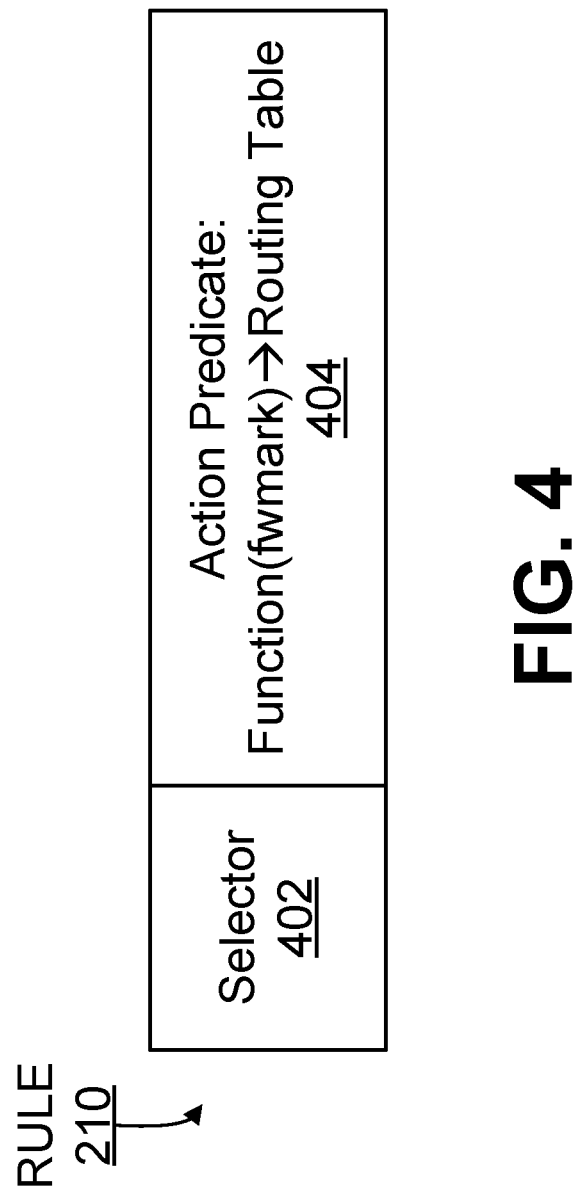
FIG. 4 shows a Policy Based Routing (PBR) rule, including a selector and action predicate, according to one embodiment.

In one embodiment, as shown in FIG. 4, each PBR rule 210 in the RPDB 208 may include both a selector 402 and an action predicate 404. In this embodiment, the action predicate 404 of a PBR rule 210 is performed in response to a value matching the selector 402 of the PBR rule 210. For example, the PBR rule $210_1$ may use a network domain indication 302 of a fwmark 300 as a selector 402 and, in response to a network domain indication 302 value matching the selector 402 of the PBR rule $210_1$, the action predicate 404 of the PBR rule $210_1$ may select a routing table 212 to be used for routing the packet 202 to a next-hop in the network system 100. In some embodiments, as described below, this selection of a routing table 212 by the action predicate 404 may be based on the entire fwmark 300. In these embodiments, the action predicate 404 utilizes a function, which takes the entire fwmark 300 as an argument, and the function indicates/selects a routing table 212.

Figure 5:
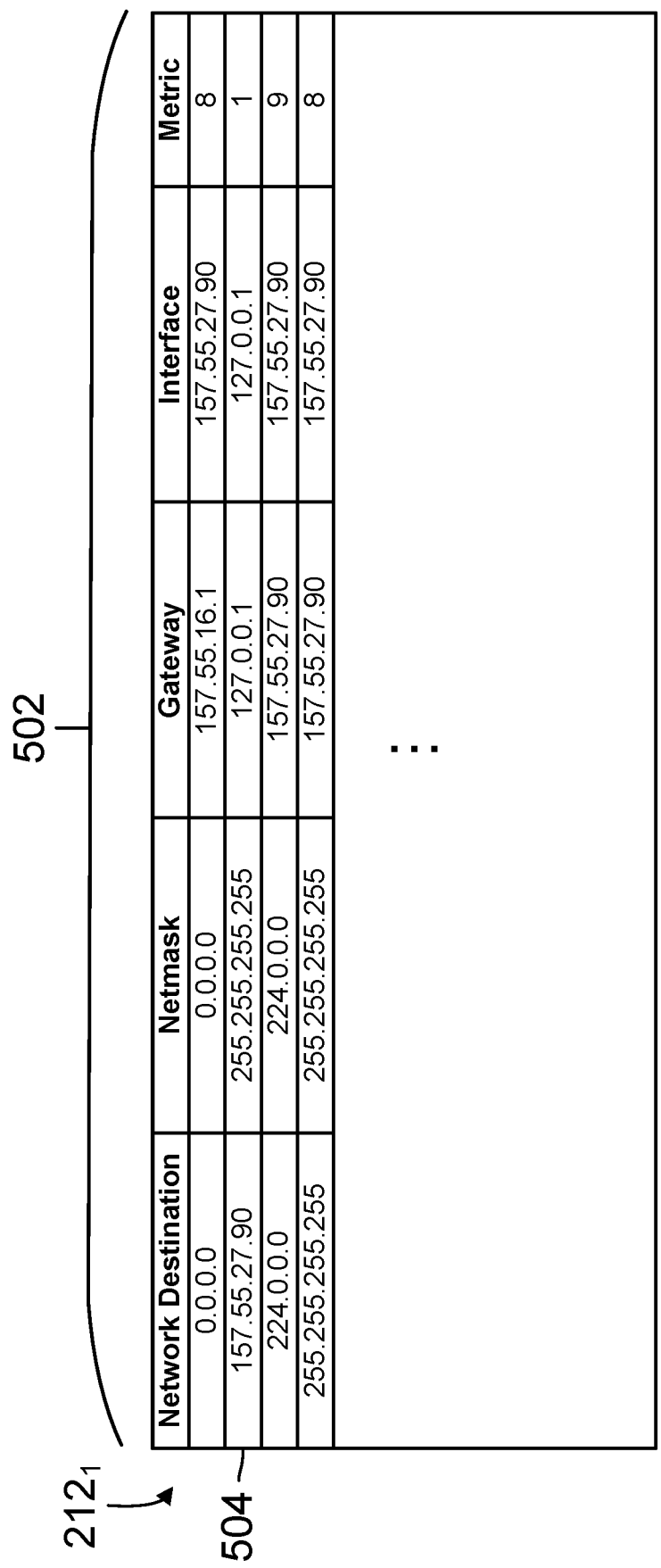
FIG. 5 shows a routing table with a set of entries according to one embodiment.

A routing table 212 indicates/describes a set of routes or next-hops that packets may take on their way to a destination. FIG. 5 shows an example routing table $212_1$ according to one embodiment. As shown in FIG. 5, the routing table $212_1$ may include a set of information fields 502, which may include a network destination address (e.g., the destination subnet), a network mask (netmask), a gateway (e.g., the next hop, or gateway, is the address of the next network device to which a packet is to be sent on the way to its final destination), an interface, and metric (e.g., a cost associated with the path that the packet is to be sent). In some embodiments, the network destination and netmask fields may be used together to identify the network domain $110_1$-$110_X$ of the destination of a packet (e.g., a next hop).

Different values in the information fields 502 may define a set of entries in the routing table 212. For example, a packet with a network destination of 157.55.27.90 may correspond to the second entry 504 in the routing table 212 of FIG. 5. In this embodiment, the packet with the network destination of 157.55.27.90 may be forwarded through the gateway/interface 127.0.0.1 to the destination.

As noted above, in some embodiments, this selection of a routing table 212 by the action predicate 404 may be performed by a function of the action predicate 404. For example, as shown in FIG. 4, the action predicate 404 may include a function that takes the fwmark 300 value of the packet 202 as an input/argument. In this example, the fwmark 300 is an independent variable and the function outputs an identifier of a routing table 212 or otherwise indicates the selection of a routing table 212 based on the fwmark 300 value.

As described above, in some instances the selector 402 for a rule 210 may be the fwmark 300 or a portion of the fwmark 300 such as the network domain indication 302. As previously noted and shown in FIG. 3, in some embodiments, the fwmark 300 may include both a network domain indication 302 and a packet classification indication 304. In some of these embodiments, a PBR rule 210 in the RPDB 208 may include a mask that is used for masking the packet classification indication 304 in the fwmark 300 value of the packet 202 and revealing/isolating the network domain indication 302. This masking may be used for comparing only the network domain indication 302 portion of the fwmark 300 with the selector 402 of the PBR rule 210. After successfully matching the network domain indication 302 of the packet 202 with the selector 402 of the PBR rule 210, the action predicate 404 of the matched PBR rule 210 may be performed (e.g., selecting a routing table 212 for the packet 202 based on the entire fwmark 300 value). In these embodiments, although the entire fwmark 300 is passed to the PBR rule 210, the selector 402 may use a mask to reveal only the network domain indication 302 for purposes of comparison with the selector 402 while the full fwmark 300 value may be used by a function of the action predicate 404 to select a routing table 212 for the packet 202.

Figure 6:
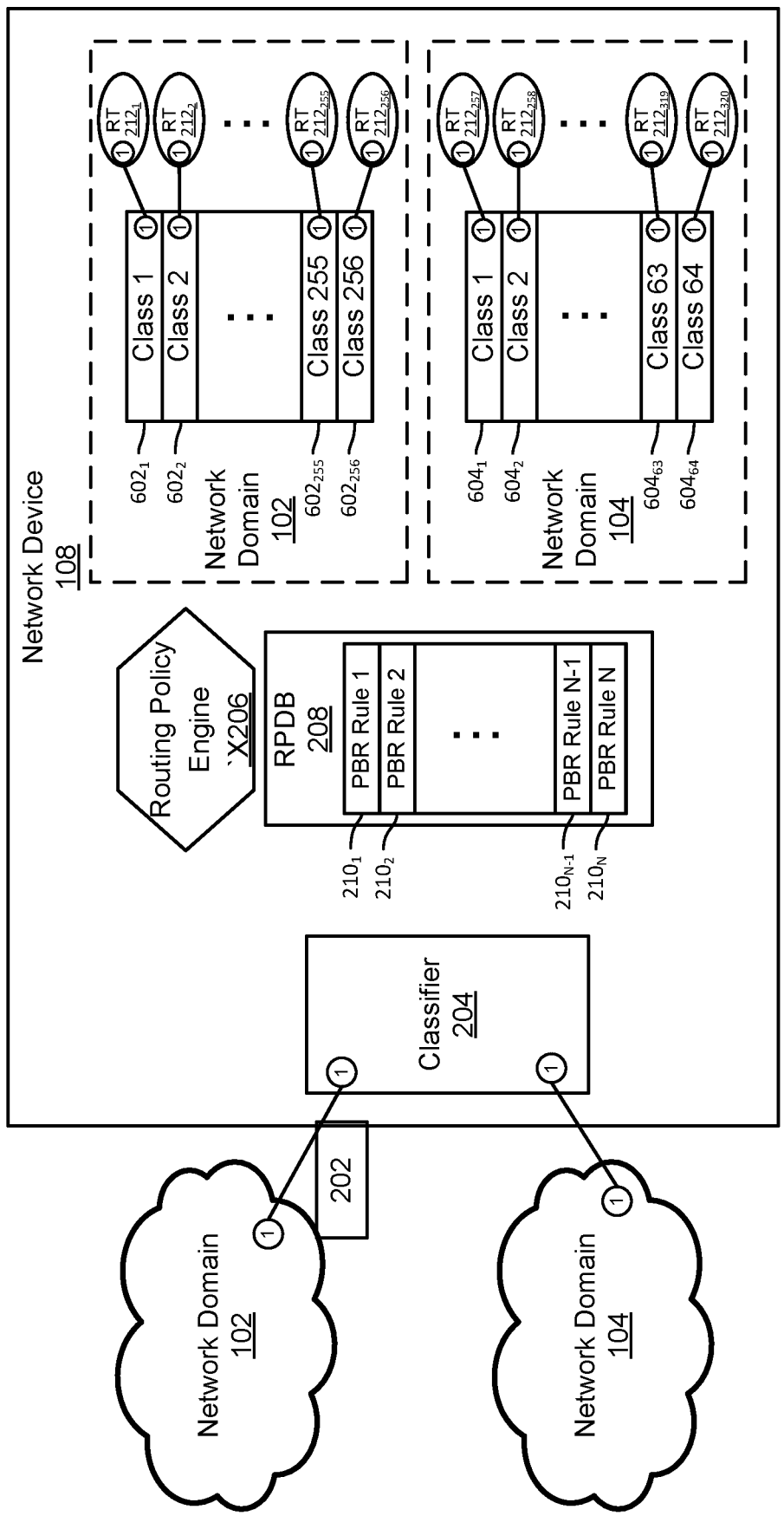
FIG. 6 shows an example of a network device, which operated in a network domain of the network system, according to one embodiment.

Since the network domain indication 302 is used to determine a match with a selector 402 of a PBR rule 210, the PBR rules $210_1$-$210_N$ may be viewed as corresponding to particular network domains. For example, the PBR rule $210_1$ may include a selector 402 that matches a network domain indication 302 for packets received from the network domain 102. Similarly, the PBR rule $210_2$ may include a selector 402 that matches a network domain indication 302 for packets received from the network domain 104. Each of the PBR rules $210_1$ and $210_2$ may include action predicates 404 with functions that map fwmark 300 values to routing tables 212. Since the action predicate 404 function of the PBR rule $210_1$ takes the fwmark 300 and consequently the packet classification indication 304 as an argument, the rule $210_1$ may be viewed as mapping classes of packets received from the network domain 102 to routing tables associated with this network domain 102. For example, as shown in FIG. 6, packets received from the network domain 102 may be mapped to the classes $602_1$-$602_{256}$ and each class $602_1$-$602_{256}$ is associated with a different routing table $212_1$-$212_{256}$ (e.g., a one-to-one mapping between fwmark 300 values and routing tables $212_1$-$212_{256}$). Similarly, packets received from the network domain 104 may be mapped to the classes $604_1$-$604_{64}$ and each class $604_1$-$604_{64}$ is associated with a different routing table $212_{257}$-$212_{320}$ (e.g., a one-to-one mapping between fwmark 300 values and routing tables $212_{257}$-$212_{320}$).

In some embodiments, the RPDB 208 may contain both rules 210 that are related to selecting routing tables 212 based on fwmark 300 values (e.g., the rule 210 shown in FIG. 4) and rules 210 that are unrelated to selecting routing tables 212 based on fwmark 300 values. For example, in one embodiment, the RPDB 208 may include a rule 210 that determines a routing table 212 based on a value/variable other than a fwmark 300 value. In another example, the RPDB 208 may contain a rule 210 that effectuates a packet to be dropped.

In some embodiments, only one action predicate 404 may be performed per received packet. Specifically, upon determining a match with a selector 402 of a PBR rule 210, the action predicate 404 for that rule 210 is executed/performed and the RPDB 208 is not queried further. In embodiments in which the RPDB 208 is sorted in order of decreasing priority, although the packet 202 may match with multiple selectors 402 of PBR rules 210 within the RPDB 208, the PBR rule 210 with the highest priority whose selector 402 matches with the packet 202 will be performed and the other PBR rules 210 will be ignored.

Following selection of a routing table 212 by the routing policy engine 206, the packet 202 may be routed to a next hop in the network system 100 according to the selected routing table 212. Specifically, the packet 202 may be mapped/matched to an entry in the selected routing table 212 and a route/next hop associated with the entry may be used for forwarding the packet 202. As shown in FIG. 1, this routing may include forwarding to one of the network domains $110_1$-$110_X$.

Figure 7:
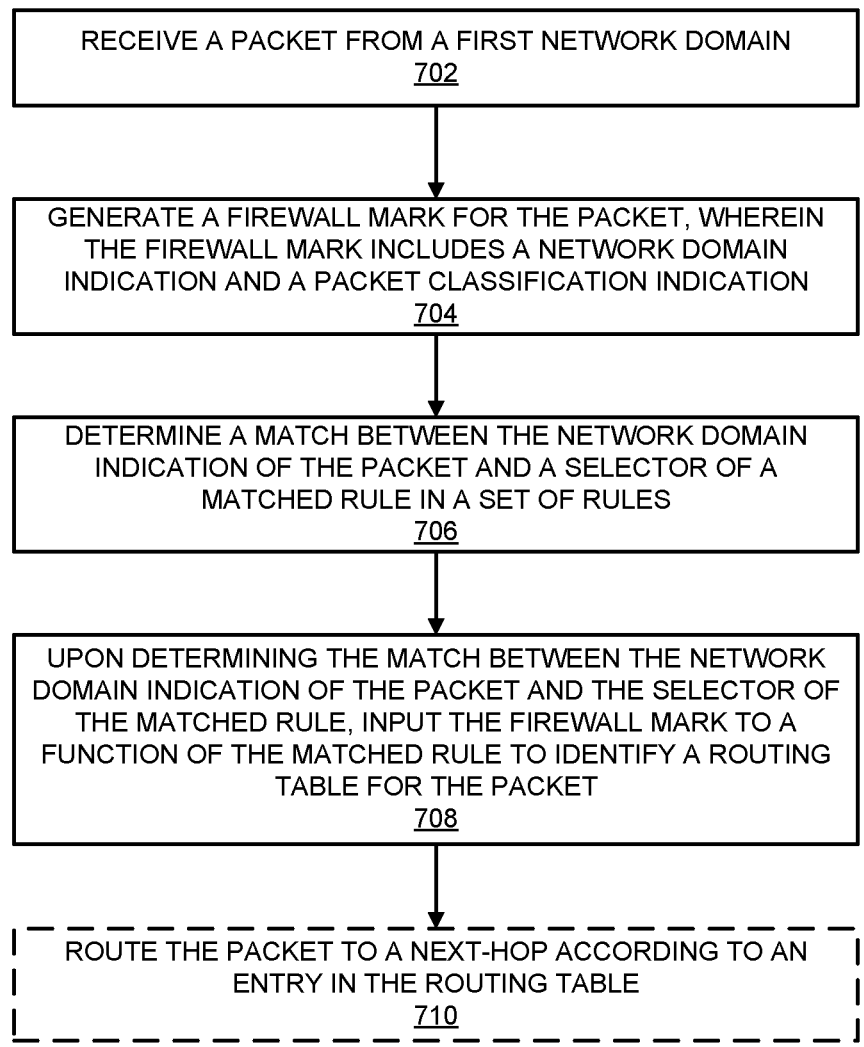
FIG. 7 shows a method for selecting a routing table in a PBR system according to one embodiment.

Turning now to FIG. 7, a method 700 for selecting a routing table in a Policy Based Routing (PBR) system will be described. The operations in the flow diagram of FIG. 7 will be described with reference to the exemplary embodiments of the other figures. In particular, the method 700 will be described in relation to the elements of FIGS. 1-6. However, it should be understood that the operations of the flow diagram in FIG. 7 can be performed by embodiments other than those discussed with reference to the other figures, and the embodiments discussed with reference to these other figures can perform operations different than those discussed with reference to the flow diagrams.

In one embodiment, the operations of the method 700 may be performed by one or more elements of the network device 108. For example, as will be described in greater detail below, one or more of the operations of the method 700 may be performed by the classifier 204 and/or the route policy engine 206. However, some operations of the method 700 may be performed in part or in whole by other elements of the network device 108.

In one embodiment, the method 700 may commence at operation 702 with receipt of a packet 202 from the network domain 102. In one embodiment, the packet 202 may be received by the classifier 204 of the network device 108 from a device operating in the network domain 102. However, in some embodiments, the packet 202 may not be received directly by the classifier 204 from the network domain 102 and instead is received by another component of the network device 108 before being received by the classifier 204.

As shown in FIG. 1, the network device 108 may be operable to receive packets from both the network domain 102 and the network domain 104. In other embodiments, the network device 108 may be operable to receive packets from more or less network domains.

The packet 202 may include various pieces of information in one or more headers (e.g., a Physical (PHY) and/or a Media Access Control (MAC) header) and/or a payload portion of the packet 202. In one embodiment, the information may include a destination address for the packet 202, which is stored in a header of the packet 202. The destination address indicates the ultimate target of the packet 202. For example, although the packet 202 may be received by the network device 108, the destination address may correspond to a device within the network domain $110_1$. In this example, the network device 108 may forward the packet 202 to a next hop in the network system 100 as will be described herein such that the packet 202 may ultimately arrive at the destination address.

Following receipt of the packet 202, a Firewall Mark (fwmark) 300 may be generated for the packet 202 at operation 704. In one embodiment, as shown in FIG. 3, the fwmark 300 may include a network domain indication 302 and a packet classification indication 304. In one embodiment, the fwmark 300, including the network domain indication 302 and the packet classification indication 304, may be generated by the classifier 204.

The network domain indication 302 uniquely identifies the network domain that the packet 202 was received from (e.g., the network domain 102). In one embodiment, the network domain indication 302 may be assigned by the classifier 204 while in other embodiments the network domain indication 302 may be assigned by another component of the network system 100. For example, the network domain indication 302 may correspond to an identifier that is used by the network system 100 to identify network domains and the classifier 204 uses these network system 100 assigned network domain identifiers for the network domain indication 302.

In one embodiment, the packet classification indication 304 may describe information within the packet 202 (e.g., describing information within a payload or header of the packet 202), information associated with the packet 202, and/or information produced from processing either of the preceding pieces of information. For example, the classifier 204 classifies packets algorithmically in accordance with specified classification criteria and outputs a packet classification indication 304. In some embodiments, this classification criteria may be specified per network domain such that packets received from the network domain 102 are classified according to a first set of classification criteria and packets received from the network domain 104 are classified according to a second set of classification criteria.

For example, the classification technique associated with the network domain 102 may be based on a hash of a source Internet Protocol (IP) address, a destination IP address and/or other information available in a header of the packet 202. In this example, the hash could be done as an Exclusive OR (XOR) of binary information representing the source IP address and the destination IP address in the header of the packet 202. However, in other embodiments, other hashing techniques may be utilized.

In one embodiment, the length of the network domain indication 302 and the length of the packet classification indication 304 may be uniform/equal across all network domains. However, in other embodiments, the length of the network domain indication 302 and/or the length of the packet classification indication 304 may be variable across network domains. For example, a network domain indication 302 for the packet 202, which was received from the network domain 102, may be of a first length whereas a network domain indication 302 for a packet received from the network domain 104 may be a second length, wherein the first length and the second length are different. In some embodiments, the variability of the lengths of the network domain indication 302 and the packet classification indication 304 may be dependent on each other. For example, the fwmark 300 may be of a predefined size across all network domains and the sum of the lengths of the network domain indication 302 and the packet classification indication 304 may not exceed this predefined size. In this example embodiment, as the length of the network domain indication 302 expands or contracts for a network domain, the length of the packet classification indication 304 will be equally and oppositely expanded or contracted such that the predefined size of the fwmark 300 is not exceeded. In one embodiment, the variability of the network domain indication 302 and the packet classification indication 304 may be specified for the classifier 204 and may be implemented/accomplished through the use of a network domain dependent mask. As described in further detail below, rules associated with network domains that include both a network domain indication 302 and packet classification indication 304 may utilize a corresponding domain dependent mask to isolate the network domain indication 302.

After generating the fwmark 300, operation 706 may determine a match between the network domain indication 302 of the fwmark 300 of the packet 202 and a Policy Based Routing (PBR) rule 210 (e.g., a matched PBR rule 210) from a set of PBR rules $210_1$-$210_N$ in a Route Policy Database (RPDB) 208. In one embodiment, as shown in FIG. 4, each PBR rule 210 in the RPDB 208 may include both a selector 402 and an action predicate 404. In this embodiment, the action predicate 404 of a PBR rule 210 is performed in response to a value matching the selector 402 of the PBR rule 210. In some embodiments, operation 706 may determine a match between the network domain indication 302 of the fwmark 300 of the packet 202 and a selector 402 of the matched PBR rule 210.

As noted above, in some embodiments, the length of the network domain indication 302 may be network domain dependent. To account for this variability, a PBR rule 210 corresponding to a network domain may use a mask corresponding to this network domain. The network domain dependent mask may be used for masking the packet classification indication 304 in the fwmark 300 value of the packet 202 and revealing/isolating the network domain indication 302. Accordingly, the comparison at operation 706 to locate the matched PBR rule 210 may include applying the network domain dependent mask prior to comparing the masked result (e.g., the network domain indication 302) with the selector 402 of a PBR rule 210. In one embodiment, operation 706 may be performed by the route policy engine 206.

Upon determining the match between the network domain indication 302 of the packet 202 and the selector 402 of a matched PBR rule 210, operation 708 may input the entire fwmark 300 to a function of the matched PBR rule 210 to identify a routing table 212 for the packet 202. In one embodiment, the function is part of the action predicate 404 of the matched PBR rule 210. For example, as shown in FIG. 4, the action predicate 404 may include a function that takes the fwmark 300 value of the packet 202 as an input/argument. In this example, the fwmark 300 is an independent variable and the function outputs/selects a routing table 212 based on the fwmark 300 value.

Since the network domain indication 302 is used to determine a match with a selector 402 of a PBR rule 210, the PBR rules $210_1$-$210_N$ may be viewed as corresponding to particular network domains. For example, the PBR rule $210_1$ may include a selector 402 that matches a network domain indication 302 for packets received from the network domain 102. Similarly, the PBR rule $210_2$ may include a selector 402 that matches a network domain indication 302 for packets received from the network domain 104. Each of the PBR rules $210_1$ and $210_2$ may include action predicates 404 with functions that map fwmark 300 values with routing tables 212. Since the action predicate 404 function of the PBR rule $210_1$ takes the fwmark 300, and consequently the packet classification indication 304, as an argument, the rule $210_1$ may be viewed as providing a one-to-one mapping classes (or fwmark 300 values) of packets received from the network domain 102 to routing tables associated with this network domain 102. For example, as shown in FIG. 6, packets received from the network domain 102 may be mapped to the classes $602_1$-$602_{256}$ and each class $602_1$-$602_{256}$ is associated with a different routing table $212_1$-$212_{256}$. Similarly, packets received from the network domain 104 may be mapped to the classes $604_1$-$604_{64}$ and each class $604_1$-$604_{64}$ is associated with a different routing table $212_{257}$-$212_{320}$.

In some embodiments, the RPDB 208 may contain both PBR rules 210 that are related to selecting routing tables 212 based on fwmark 300 values (e.g., the PBR rule 210 shown in FIG. 4) and PBR rules 210 that are unrelated to selecting routing tables 212 based on fwmark 300 values. For example, in one embodiment, the RPDB 208 may include a PBR rule 210 that determines a routing table 212 based on a value/variable other than a fwmark 300 value. In another example, the RPDB 208 may contain a PBR rule 210 that effectuates the packet 202 to be dropped. In still another example, the RPDB 208 may contain a PBR rule 210 with a selector 402 and a discrete action predicate 404 to be taken in direct response to a match with the selector 402.

In some embodiments, only one action predicate 404, may be performed per received packet 202. Specifically, upon determining a match with a selector 402 of a PBR rule 210, the action predicate 404 for that PBR rule 210 is executed/performed and the RPDB 208 is not queried further. In embodiments in which the RPDB 208 is sorted in order of decreasing priority, although the packet 202 may match with multiple selectors 402 of PBR rules 210 within the RPDB 208, the PBR rule 210 with the highest priority whose selector 402 matches with the packet 202 will be performed.

In one embodiment, operation 708 may be performed by the routing policy engine 206.

Following identification/selection of a routing table 212 for the packet 202, the packet 202 may be forwarded at operation 710 according to an entry in the identified/selected routing table 212. For example, an entry within the routing table 212 selected at operation 708 may correspond to a destination address of the packet 202. Using one or more additional fields of this matched entry (e.g., network destination and netmask fields), a next hop in the selected network domain may be determined. At operation 710, the packet 202 may be forwarded to this next hop (e.g., a destination in one of the network domains $110_1$-$110_X$).

In systems with a large amount of PBR rules 210 and where PBR based selection of routing tables 212 is based on packet classification, the systems and methods described herein drastically speed up the selection of routing tables 212. Specifically, in typical real world deployment scenarios, with several hundred PBR rules, routing table 212 selection has been measured at one-hundred times faster in comparison to traditional techniques. This improved performance is achieved without degrading other PBR based capabilities.

Further, the described systems and methods, which act on PBR rules 210 using the fwmark 300 as a selector 402, still work in concordance/harmony with PBR rules 210 in a RPDB 208 acting on selectors 402 other than fwmark 300. For example, a higher priority PBR rule 210 can be inserted in RPDB 208 to drop or segregate certain traffic based on a source IP selector 402.

Additionally, the described systems and methods lead to a more compact RPDB 208 with fewer entries (e.g., PBR rules 210) than traditional systems. In particular, several PBR rules 210 covering the selection of routing tables 212 using fwmark 300 as a selector 402 for a single network domain may be combined into a single PBR rule 210. This reduced number of PBR rules 210 produces a more compact RPDB 208 that is easier to manage.

The systems and methods described herein may be applicable to load balancing, firewalling or routing systems that use a plurality of routing tables 212. Additionally, the PBR described herein may be independent of the specific product and supports multiple network domains with overlapping IP addresses.

As noted above, the system and methods described herein may be performed by one or more electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 8A:
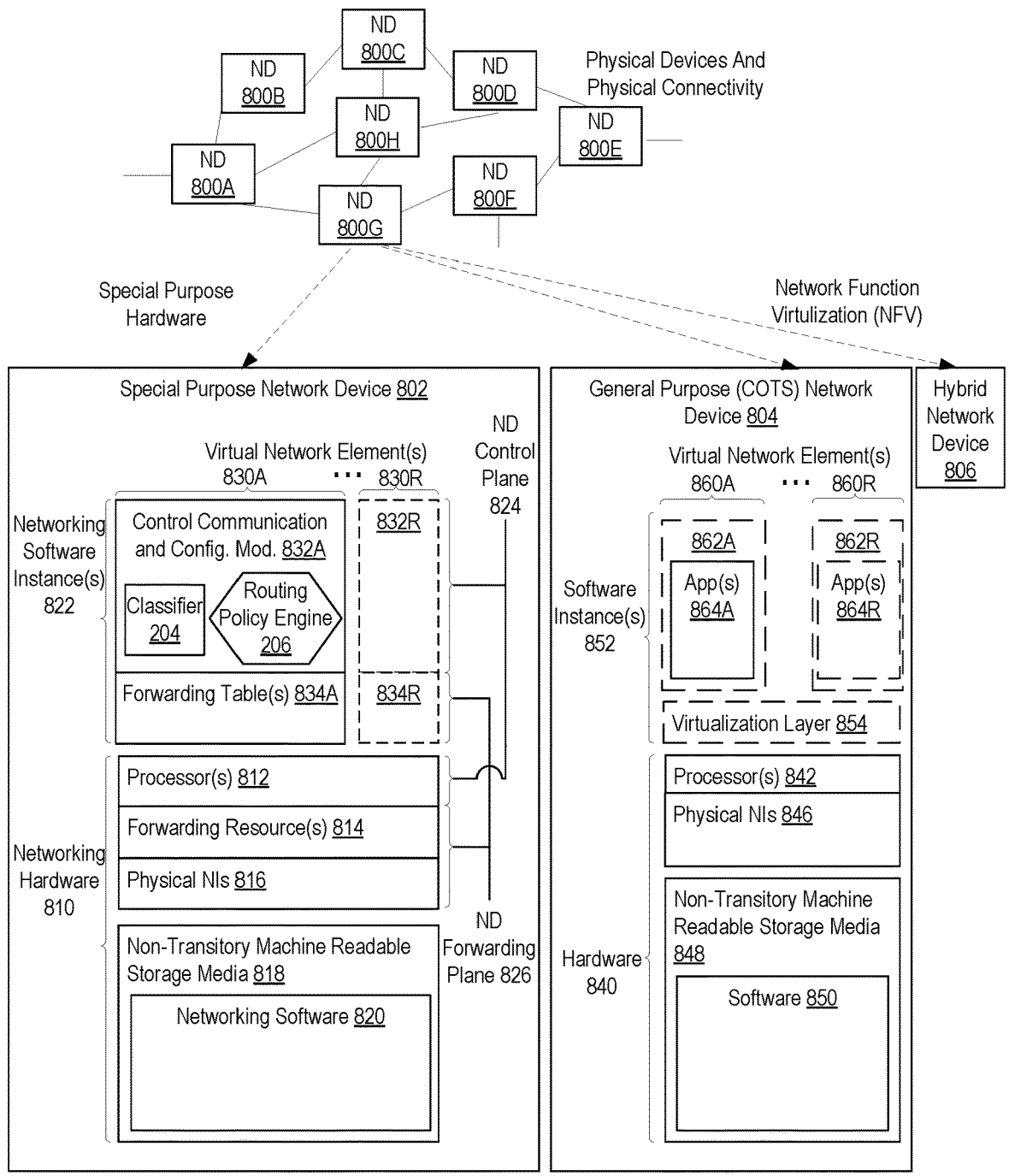
FIG. 8A illustrates connectivity between network devices (NDs) within an exemplary network, as well as three exemplary implementations of the NDs, according to some embodiments.

FIG. 8A illustrates connectivity between network devices (NDs) within an exemplary network, as well as three exemplary implementations of the NDs, according to some embodiments. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising a set of one or more processor(s) 812, forwarding resource(s) 814 (which typically include one or more ASICs and/or network processors), and physical network interfaces (NIs) 816 (through which network connections are made, such as those shown by the connectivity between NDs 800A-H), as well as non-transitory machine readable storage media 818 having stored therein networking software 820. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

The special-purpose network device 802 is often physically and/or logically considered to include: 1) a ND control plane 824 (sometimes referred to as a control plane) comprising the processor(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the processor(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
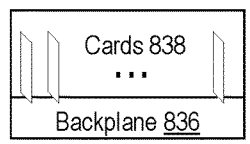
FIG. 8B illustrates an exemplary way to implement a special-purpose network device according to some embodiments.

FIG. 8B illustrates an exemplary way to implement the special-purpose network device 802 according to some embodiments. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and physical NIs 846, as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the physical NI(s) 846, as well as optionally between the instances 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
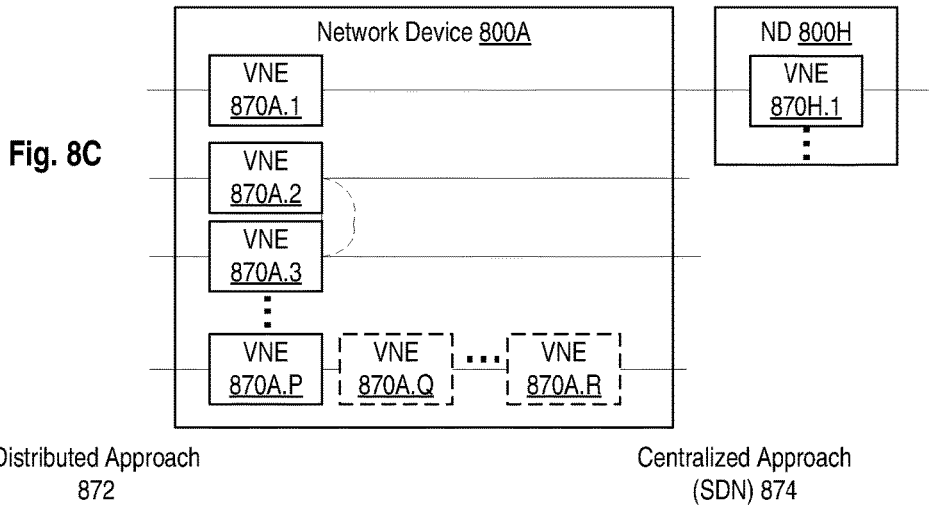
FIG. 8C illustrates various exemplary ways in which virtual network elements (VNEs) may be coupled according to some embodiments.

FIG. 8C illustrates various exemplary ways in which VNEs may be coupled according to some embodiments. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the processor(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
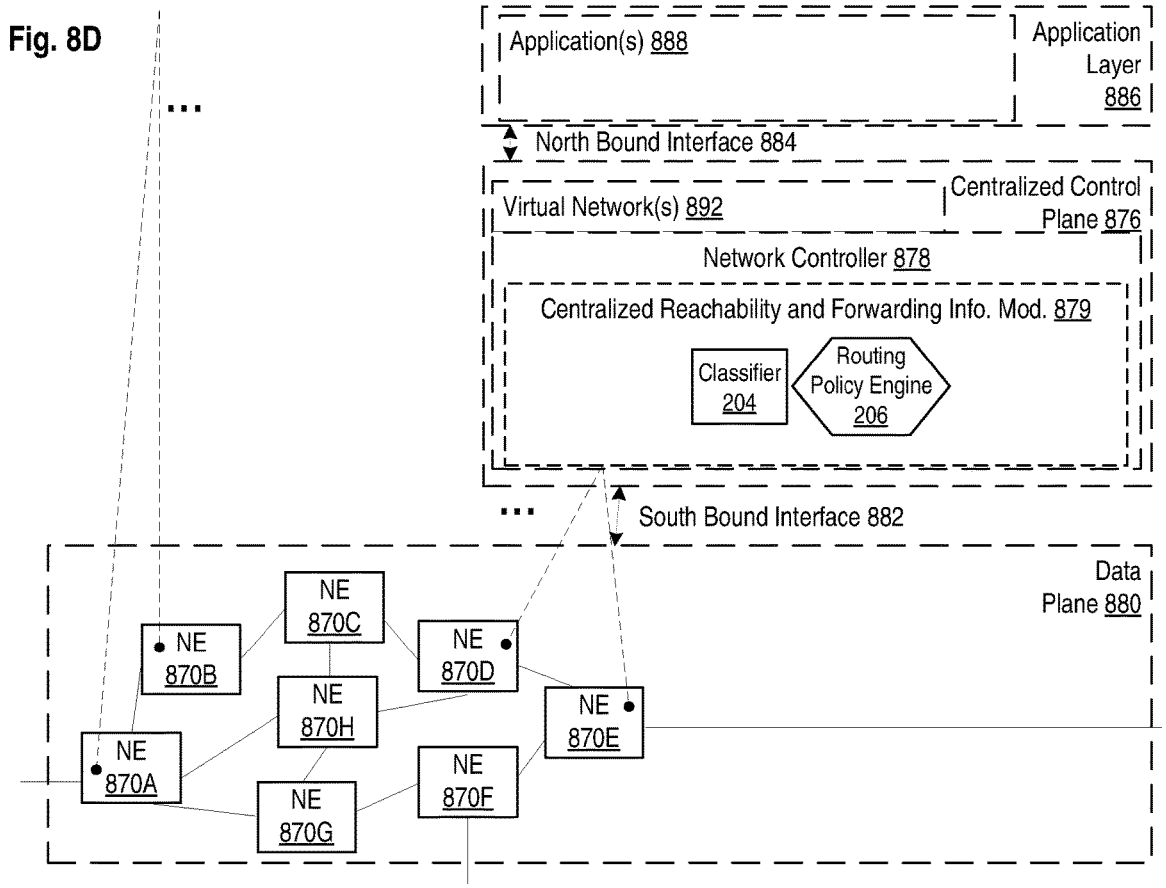
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 870A-H (e.g., the processor(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the processor(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
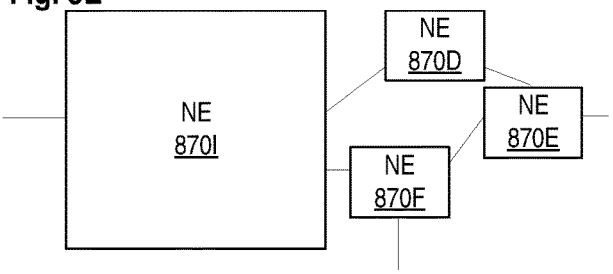
FIG. 8E illustrates the simple case of where each of the NDs implements a single NE, but a centralized control plane has abstracted multiple of the NEs in different NDs into (to represent) a single NE in one of the virtual network(s), according to some embodiments.
Figure 8F:
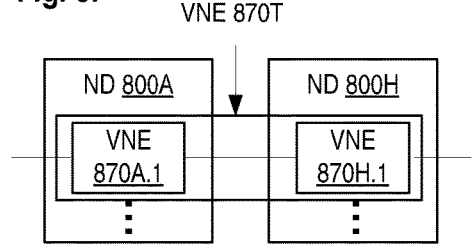
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments. Thus, the abstraction of a NE or VNE can span multiple NDs.

While some embodiments implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
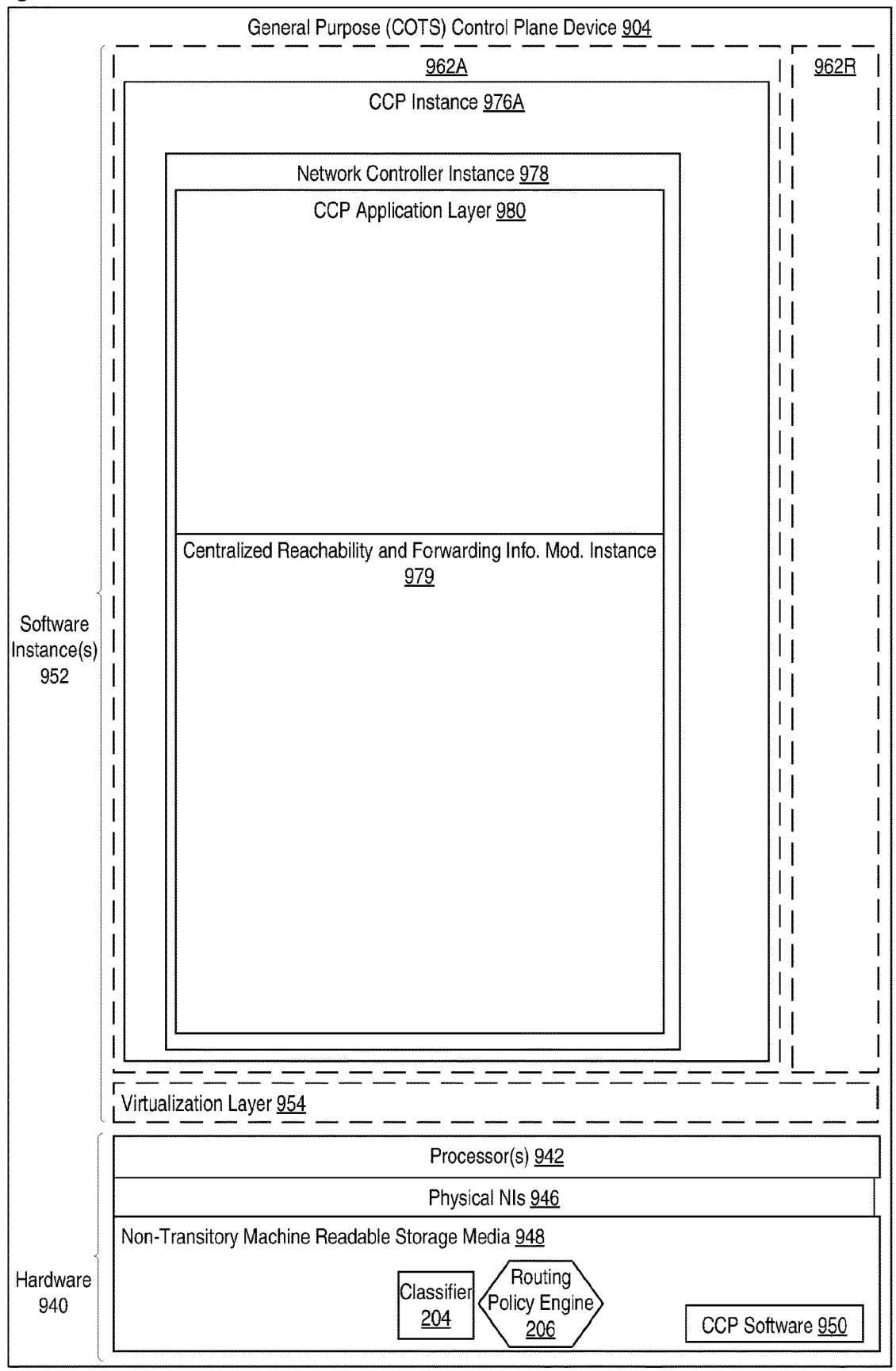
FIG. 9 illustrates a general purpose control plane device with centralized control plane (CCP) software 950, according to some embodiments.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and physical NIs 946, as well as non-transitory machine readable storage media 948 having stored therein centralized control plane (CCP) software 950.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and she unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user-interfaces). At a more abstract level, this CCP application layer 980 within the centralized control plane 876 works with virtual network view(s) (logical view(s) of the network) and the middleware layer provides the conversion from the virtual networks to the physical view.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDsNEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+(Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

In one embodiment, one or more of operations and functionality described above in relation to FIGS. 1-7 may be implemented by components described in relation to the approaches and elements of FIGS. 8A-8F and 9. For example, the classifier 204 and/or the routing policy engine 206 may reside in the control communication and configuration module 832A of the special purpose device 802 or an equivalent in the general purpose network device 804 or the hybrid network device 806. In another example, the classifier 204 and/or the routing policy engine 206 may reside in the centralized reachability and forwarding information module 879 of the centralized control plane 876. In still another embodiment, the classifier 204 and/or the routing policy engine 206 may reside in a machine readable storage medium, including the non-transitory machine-readable storage media 948 and the processor 942 may be configured to execute the classifier 204 and/or the routing policy engine 206.

In some embodiments, virtualization may be utilized to provide NFV. For example, the network device 108 may be a computing device configured to execute one or more virtual machines, containers, and/or microservices to provide NFV. In some embodiments, the network device 108 may be a control plane device (e.g., the general purpose control plane device 904) that is configured to implement a control plane of SDN.

While the systems, devices, structures, methods, and designs herein have been described in terms of several embodiments, those skilled in the art will recognize that the systems, devices, structures, methods, and designs are not limited to the embodiments described, can be practiced with modification and alteration within the spirit and scope of the appended claims. The description is thus to be regarded as illustrative instead of limiting.

Additionally, while the flow diagrams in the figures show a particular order of operations performed by certain embodiments, it should be understood that such order is exemplary (e.g., alternative embodiments may perform the operations in a different order, combine certain operations, overlap certain operations, etc.).

What is claimed is:

1. A method, implemented by a network device, for selection of a routing table in a Policy Based Routing (PBR) system, the method compromising:
   receiving a packet from a first network domain;
   generating a firewall mark for the packet, wherein the firewall mark includes a network domain indication and a packet classification indication;
   determining a match between the network domain indication of the packet and a selector of a matched rule in a set of rules; and
   upon determining the match between the network domain indication of the packet and the selector of the matched rule, inputting the firewall mark to a function of the matched rule to identify a routing table for the packet.

2. The method of claim 1, further comprising:
   routing the packet to a next-hop according to an entry in the routing table.

3. The method of claim 1, wherein determining a match includes applying a mask to the firewall mark to mask the packet classification indication of the firewall mark and identify the network domain indication of the firewall mark.

4. The method of claim 1, wherein the function of the matched rule provides a one-to-one mapping between firewall mark values and routing tables in a first set of routing tables associated with the first network domain.

5. The method of claim 4, wherein the routing table of the packet is in the first set of routing tables.

6. The method of claim 4, wherein the set of rules includes a rule corresponding to a second network domain,
wherein the rule corresponding to the second network domain includes a selector that matches an identifier of the second network domain and a function that provides a one-to-one mapping between firewall mark values and routing tables from a second set of routing tables associated with the second network domain.

7. The method of claim 6, wherein the network domain indication of the matched rule corresponding to the first network domain is of a first length and the network domain indication of the rule corresponding to the second network domain is of a second length, and
wherein the first length and the second length are different.

8. The method of claim 1, wherein the set of rules includes a rule with a selector and a discrete action to be taken in direct response to a match with the selector.

9. The method of claim 1, wherein the packet classification indication describes one or more of information in the packet or information associated with the packet.

10. The method of claim 1, wherein the packet classification indication describes one or more of a hash of an address of the packet and a category of data within the packet.

11. The method of claim 1, wherein the network domain indication is set to an identifier of the first network domain.

12. The method of claim 1, wherein the set of rules are part of a Route Policy Database (RPDB).

13. A network device comprising:
a non-transitory machine-readable storage medium having stored therein a classifier and a routing policy engine; and
a processor coupled to the non-transitory machine-readable storage medium, the processor configured to execute the classifier and the routing policy engine,
wherein the classifier is configured to receive a packet from a first network domain and generate a firewall mark for the packet, wherein the firewall mark includes a network domain indication and a packet classification indication, and
wherein the routing policy engine is configured to determine a match between the network domain indication of the packet and a selector of a matched rule in a set of rules and upon determining the match between the network domain indication of the packet and the selector of the matched rule, input the firewall mark to a function of the matched rule to identify a routing table for the packet.

14. The network device of claim 13, wherein determining a match includes applying a mask to the firewall mark to mask the packet classification indication of the firewall mark and identify the network domain indication of the firewall mark.

15. The network device of claim 13, wherein the function of the matched rule provides a one-to-one mapping between firewall mark values and routing tables in a first set of routing tables associated with the first network domain.

16. The network device of claim 15, wherein the routing table of the packet is in the first set of routing tables.

17. The network device of claim 15, wherein the set of rules includes a rule corresponding to a second network domain,
wherein the rule corresponding to the second network domain includes a selector that matches an identifier of the second network domain and a function that provides a one-to-one mapping between firewall mark values and routing tables from a second set of routing tables associated with the second network domain.

18. The network device of claim 13, wherein the packet classification indication describes one or more of information in the packet or information associated with the packet.

19. The network device of claim 18, wherein the network device is a control plane device configured to implement a control plane of a software defined networking (SDN).

20. The network device of claim 13, wherein the network device is a computing device configured to execute a plurality of virtual machines, the plurality of virtual machines implementing network function virtualization (NFV).

* * * * *